Figure 1:
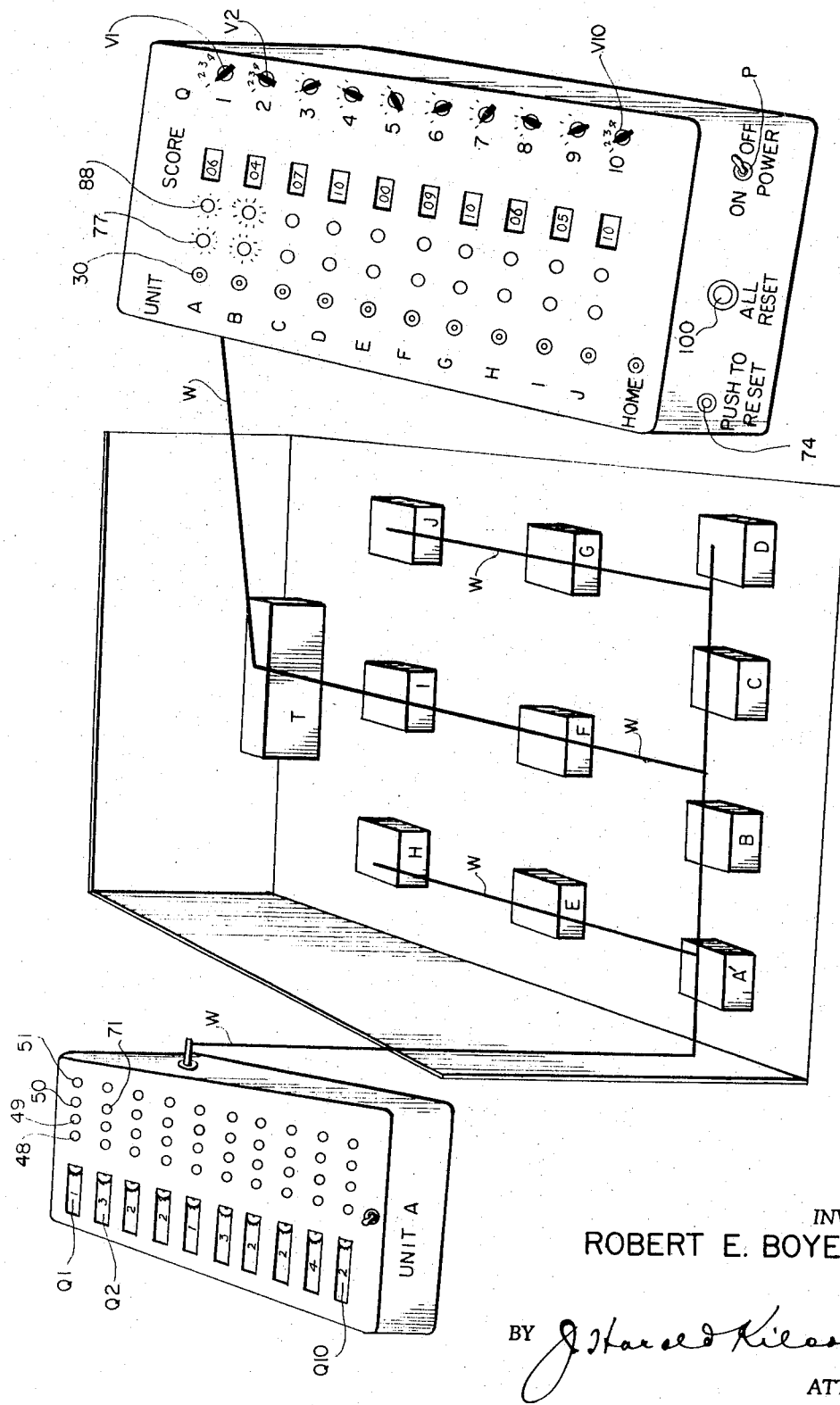

April 18, 1967  R. E. BOYETT  3,314,172
TESTING SYSTEMS

Filed June 15, 1965  4 Sheets-Sheet 1

INVENTOR
ROBERT E. BOYETT

BY *J. Harold Kilcoyne*

ATTORNEY

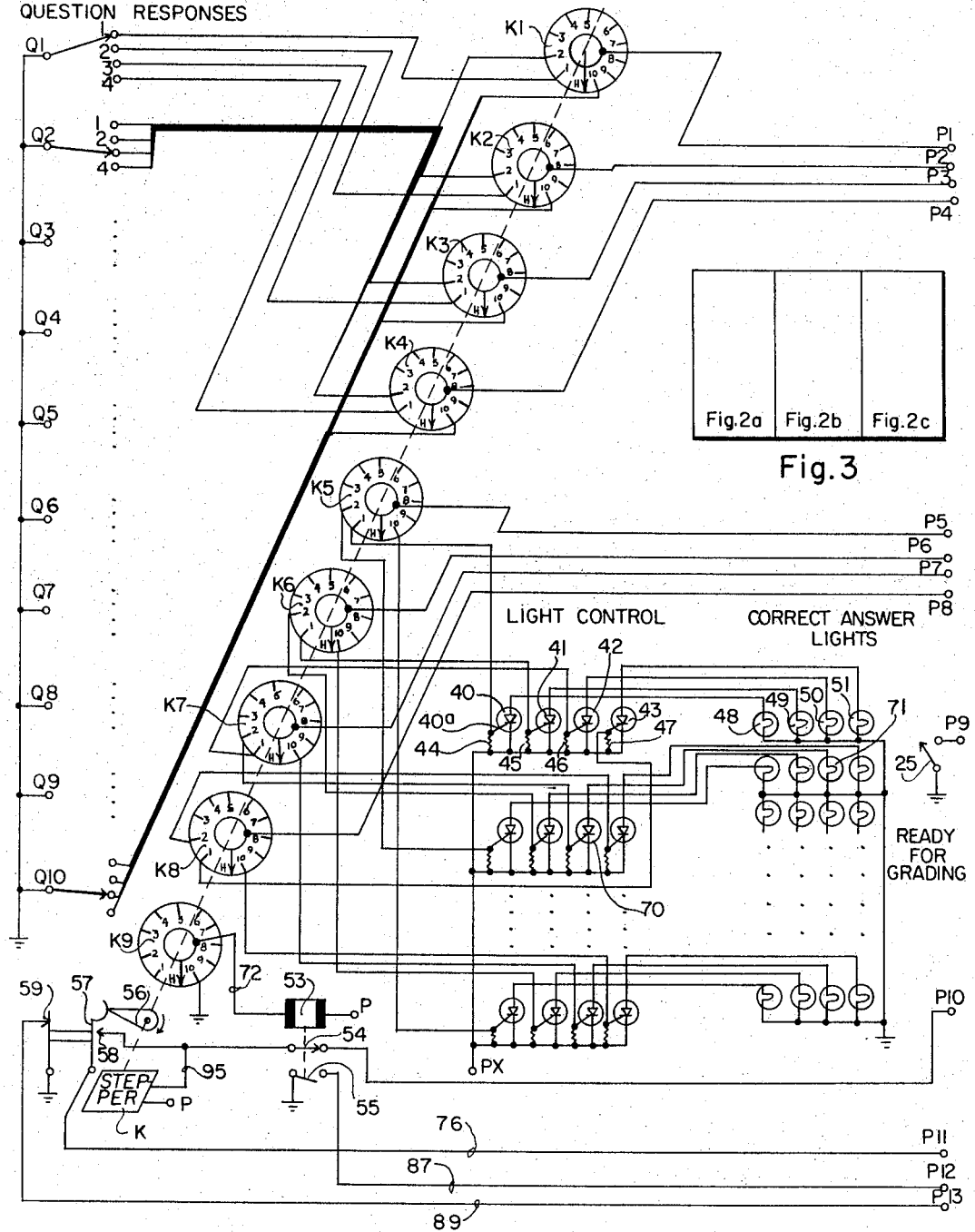

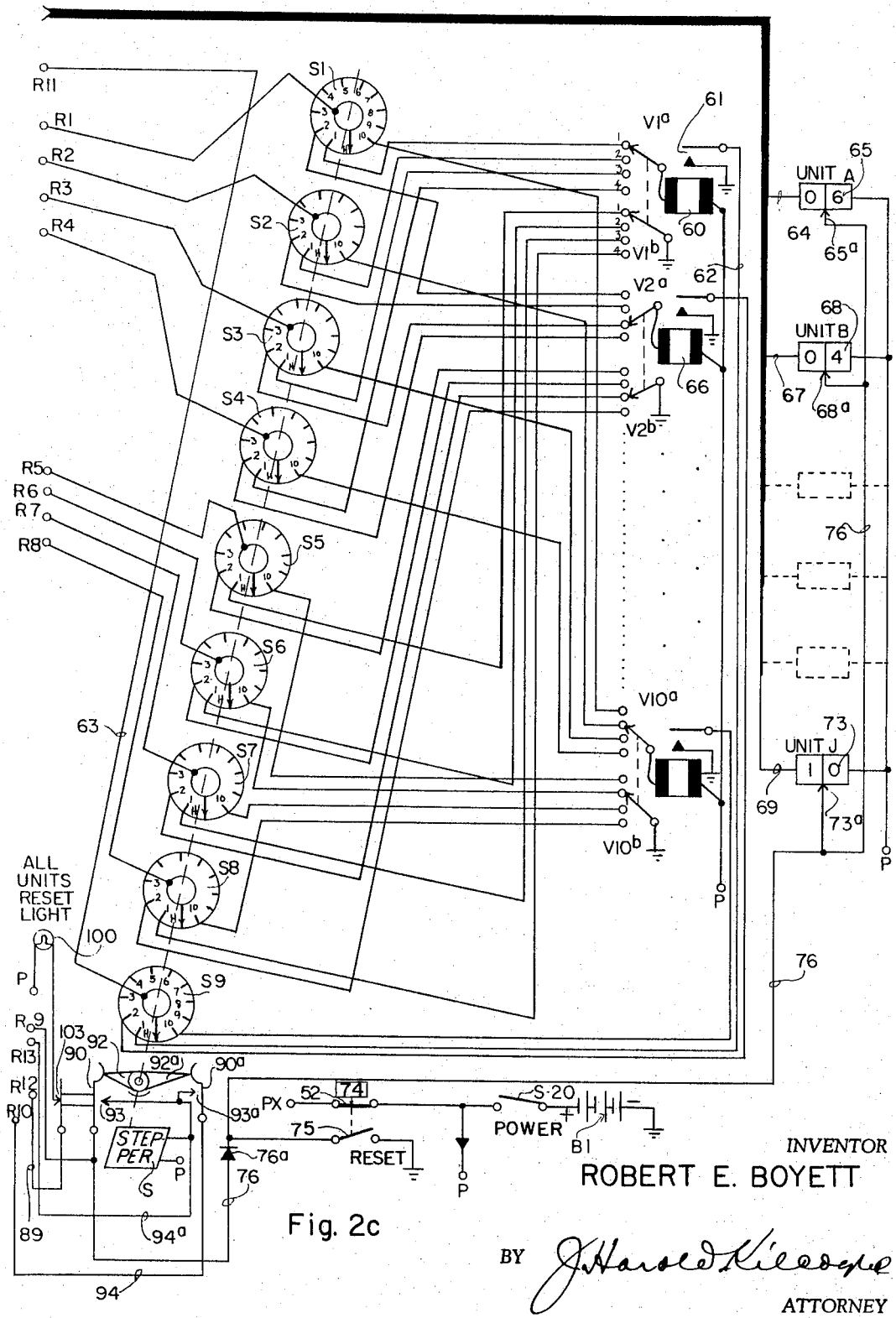

United States Patent Office
3,314,172
Patented Apr. 18, 1967

3,314,172
TESTING SYSTEMS
Robert E. Boyett, 6130 Shenandoah St.,
Orlando, Fla. 32807
Filed June 15, 1965, Ser. No. 464,078
20 Claims. (Cl. 35—48)

This invention relates to electrical testing systems of a type suitable for use in a classroom, and more specifically relates to a system for indicating, for instance to a teacher at a central console location, the response of each person in a group of students to whom a compiled list of questions and associated multiple-choice answers are presented.

It is a principal object of this invention to provide an improved system of the above type which will provide rapid and accurate examination of a large number of students and will provide means for automatically recording and indicating to the teacher the grade attained by each student, while at the same time indicating to each student the correct answers to the questions while the questions are still before the student and fresh in his mind.

The utility of the present system is enhanced by the ever-increasing size of classes which makes it important to be able to examine the students in a manner which is highly efficient. In a classroom equipped with this system, frequent examinations can be made both to determine areas of the subject matter with respect to which further emphasis would be most helpful, as well as to grade the degree of proficiency of each student examined.

It is another object of the invention to provide an examination and grading system which gives an entire examination, and compiles complete scoring of that examination, with regard to a large number of questions presented together with a selection of multiple-choice answers for each question.

It is another object of this invention to provide means whereby the teacher can pre-set a complete set of correct answers into the console prior to scanning the student's answers selected at the individual response units, these correct answers serving both for automatic comparison with the grading of the students' answers, and also serving to operate correct-response indicator means corresponding to each question and located at the students' response units, the correct answers appearing at each response unit after the student has completed his own selection of answers and at the time they are scanned, and remaining as continuous indications thereat until the entire system is reset by the teacher.

It is another object of the invention to provide novel circuitry by which the response units are scanned by the teacher, one at a time, in response to electrical indication by the student that his unit is ready for scanning. Each question switch at a unit then has its multiple positions scanned to determine whether coincidence exists between its selected position and the correct position pre-set by the teacher.

A further object of the invention is to provide means for recording the number of questions with respect to which coincidence has been obtained with the pre-set correct answers, and for retaining such recorded number of correct responses on separate counter units to show the score which each student has attained.

A further object of the invention is to provide scan-complete indicator means at the console and operative to indicate completion of scanning for each unit, whereby the teacher can see which units have already been scanned.

Another object of the invention is to provide a system in which all data is retained until the system is manually reset by the operator in preparation for a new test cycle, for instance involving different questions, or perhaps involving a different group of students.

It is also the object of this invention to provide a flexible system which can be designed or expanded to provide the capacity for examining any desired number of students with regard to any desired number of questions and any number of multiple-choice answers, the scanning means being actuated by a stepping oscillator whose frequency can be adjusted to provide scanning at an optimum rate consistent with accuracy.

Figure 2B:
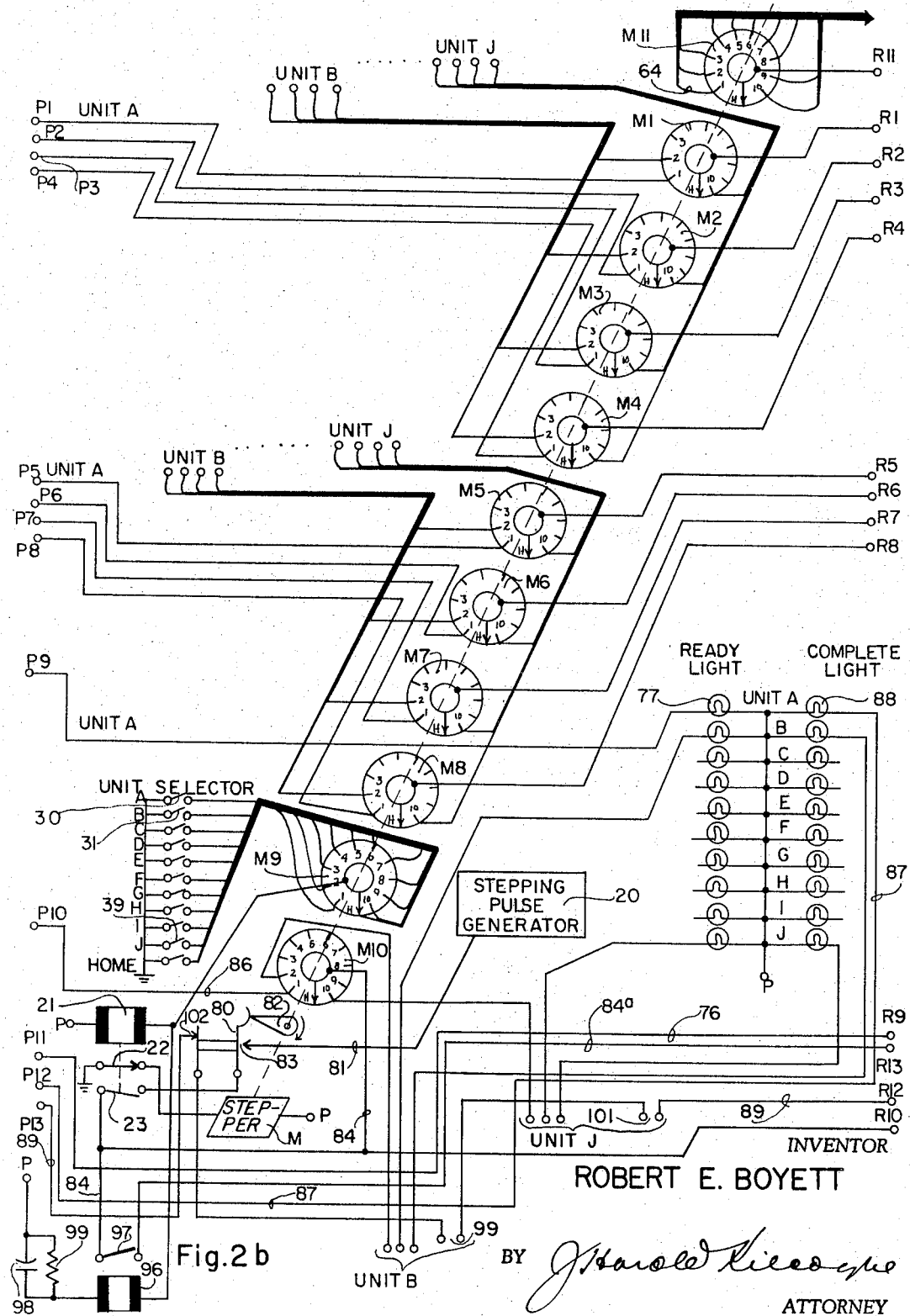

Other objects and advantages of the invention will become apparent during the following discussion of the drawings, wherein:

FIG. 1 is a pictorial view of a system according to the present invention, showing one possible lay-out of the console, and the student-response units;

FIGS. 2a, 2b, and 2c toegther form a composite circuit diagram of a system capable of examining ten response units to determine the number of correct answers to 10 questions each having four answer choices; and FIG. 3 is a diagram showing the manner in which FIGS. 2a, 2b and 2c should be mutually arranged side-by-side.

Referring now to FIG. 1, this figure shows a classroom having ten student units A through J, and located opposite a teacher's desk T. Student response unit A is shown removed from the location A' and enlarged to show a satisfactory lay-out of components. The teacher's desk supports a console which in FIG. 1 is shown removed from the desk and enlarged to show a suitable lay-out of console components. Cabled wiring W connects the various units A through J with the console, in the manner to be hereinafter described. The various components shown on the console and on the response unit A bear the same reference characters as the same components when shown in FIG. 2a, 2b and 2c.

FIG. 3 shows the mutual relationship between FIGS. 2a, 2b, and 2c in order to provide a unified schematic diagram of the system. FIG. 2a includes the components which are contained within the response unit A, but for the sake of simplification, shows the actual wiring only of the circuits relating to questions Q1, Q2 and Q10, the other wiring having been omitted.

FIGS. 2b and 2c, when combined, show the circuitry included in the teacher's console. The wiring extending from the left edge of FIG. 2b is the wiring which goes inside the cable W to response unit A. Other locations within FIG. 2b shows the wiring which would go to response unit B and to response unit J, the wiring for response units C through I, inclusive, having been omitted for the purpose of simplifying the schematic diagram.

In the illustrative embodiment shown in FIGS. 2a, 2b, and 2c, there are three stepper switches respectively labeled K, M and S. The stepper M includes 11 separate switch decks labeled M1 through M11, and each including 10 positions labeled 1 through 10 and a home position labeled H. The stepper mechanism itself, labeled M, is an intermittent ratchet mechanism of well-known type which steps from position-to-position so long as power is applied to the stepper mechanism.

Power for the entire system is supplied from a source such as the battery B1 shown at the bottom of FIG. 2c, and the flow of power is controlled by a power switch S20. When this switch is closed, power is supplied to all terminals labeled P in all three sheets comprising the schematic diagram of FIGURE 2. Thus, the stepper mechanism M in FIG. 2b will cause the stepper switch decks M1 through M11 to step intermittently so long as the left lead from the stepper M has been grounded, as will be hereinafter described. The purpose of the stepper switch decks M1 through M11 is to select which one of the response units A through J is being scanned. When the stepper M is in the home position, it is not connected to any of the response units.

The function of the stepping switch decks K1 through K9, and of the stepping switch decks S1 through S9, is entirely different from the function of the stepper M which chooses a single response unit for scanning. The switches K and S scan the questions and answers after the stepper M has selected one of the units to be scanned. Therefore, it is necessary that the stepper mechanisms S and K always remain synchronized with each other so that an instant never arrives when the switch K is scanning one of the questions and the switch S is scanning a different question. Therefore, the stepper mechanisms K and S are not of a free running type as is the mechanism M, but are connected so that they are moved in unison with each other each time a stepping pulse is delivered from the stepping pulse generator 20 located near the bottom of FIG. 2b. The manner in which all of the steppers K, S and M are controlled will be described hereinafter under the heading Control circuits.

*Selecting a unit*

As stated above, the decks of the stepper switch M determine which of the units A through J is connected to the console for scanning at any particular moment. As the questions are successively scanned, the switch decks M1, M2, M3, and M4 connect the four possible answers to each question for comparison with the correct answers which have been previously inserted by the teacher at the console. At the same time, the switch decks M5 through M8 insert indication of the correct answer into the correct-answer lights located on the particular response unit being scanned.

Switch deck M10 connects drive from the stepping pulse generator 20 to the stepper K inside whichever unit is being scanned. The stepper deck M11 connects the grade counters showing the number of correct answers attained by each response unit for advancement while that particular unit is being scanned.

Stepper deck M9 is the switching means by which the stepper mechanism M itself is operated under the manual control of the teacher for the purpose of selecting the position of the stepper M and thereby selecting which response unit is being scanned. If the teacher decides to scan response unit A, he closes switch 30 which grounds position #1 of the deck M9. The wiper on deck M9 is connected to the winding on relay 21. Therefore, this relay winding 21 will be grounded only when the wiper of deck M9 is in the #1 position, selecting unit A.

Relay 21 has two sets of contacts including normally closed contacts 22 and normally open contacts 23. When the relay winding 21 is de-energized, the stepper unit K continues its own intermittent stepping to move the deck wipers around from position to position. However, when it reaches position #1, the relay winding 21 becomes energized and the relay opens switch 22. Therefore, the power is removed from the stepper mechanism M and the mechanism stops in the position where all of its decks select response unit A. Similarly, if switch 31 were closed instead of switch 30, the stepper K would select unit B. The closing of the switch 39 would select unit J, and the closing of the switch marked "home" would return the stepper switch decks to the H position in which no unit is selected. Since it is obviously undesirable to select more than one unit at a time, the switches 30 through 39, inclusive, and the "home" switch should either comprise a single rotary switch, or an interlocked pushbutton system in which all other buttons are released whenever a new button is depressed.

*Response-unit components*

The schematic diagram of FIG. 2a represents response unit A, and is similar to all other response units. Each of the response units includes a nine-deck scanning switch including a stepper mechanism K which moves the wipers of all nine scanner decks K1 through K9 by one position each time the stepper mechanism is pulsed as will be described below under the heading Control circuits. The positions labeled 1 through 10 of switch decks K1 through K9 respectively select different ones of the ten questions. Position #1 selects question No. 1; position #2 selects question #2, etc. These decks also have home positions marked H. There is a reset mechanism which resets the entire mechanism and as a result resets scanners K1 through K9 to their home positions. The reset mechanism will be described hereinafter.

Scanner decks K1 through K4 scan the four possible student answers which comprise the multiple-choices of the various questions. Scanner decks K5 through K8 serve to turn on the appropriate correct-answer lights at the student's unit as will be hereinafter explained. Scanner deck K9 serves to inform the system when all of the questions at unit A have been scanned, and thus operates the control circuits to cease scanning as described below.

By refernce to FIGS. 1 and 2a, it will be seen that the response unit A includes 10 rotary hand switches, each having one position for each of the possible multiple-choice answers. These switches are labeled Q1, Q2, Q3, . . . Q10. In the drawings shown in FIG. 2, the student has selected answer No. 1 for question No. 1, answer No. 3 for question 2, and answer No. 3 for question 10, the other responses not being shown in the drawings.

It is desirable that the switches for questions Q1 through Q10 have numbers as shown in the windows associated with the switches in FIG. 1 by which the student can see which position the switch occupies. Switch decks K1, K2, K3, and K4, when in the number 1 position, connect all four possible positions of switch Q1 to terminals P1, P2, P3, and P4, which in turn connect to similar terminals in FIG. 2b and then to the number 1 positions of the switch decks M1, M2, M3, and M4. Assuming that the stepper switch M is in position #1, thereby selecting unit A, the terminals P1, P2, P3, and P4, will be connected through the switch decks, respectively, to the terminals R1, R2, R3, and R4 which in turn connect with the wipers of switch decks S1, S2, S3, and S4 for the purpose of determining whether the correct answer to question No. 1 has been selected, and for advancing the grade counters if correct selection has been made. FIGURE 2c will be described hereinafter, but for present purposes, it is enough to state that one of the terminals R5, R6, R7 and R8 will also receive from the circuit of FIG. 2c energization in the form of a completed ground circuit, depending upon the answer to question No. 1 which has been entered by the teacher at the console. Therefore, one of the wipers in switch decks M5, M6, M7 or M8 will be grounded, and since unit A has been selected by the step switch M, one of the terminals P5, P6, P7, or P8 will be grounded, thereby grounding the wiper of the corresponding scanner deck K5, K6, K7 or K8. Since the scanner K is still in position #1, selecting question No. 1, the number 1 terminal of one of the switch decks K5, K6, K7 or K8 will be grounded.

These terminals #1 of the respective scanner decks K5, K6, K7, and K8 connect respectively to the gating electrodes of the four silicon-controlled rectifiers 40, 41, 42, and 43, across resistors 44, 45, 46, and 47. The main circuits through the silicon-controlled rectifiers 40 through 43 are connected in series with light bulbs 48, 49, 50, and 51. One side of each light bulb is grounded and the other side goes through the silicon-controlled rectifier to the power source PX. As is well-known in the prior art, a silicon controlled rectifier behaves in a manner analogous to a thyratron. It is normally an open circuit until its control electrode is pulsed. The silicon-controlled rectifier then avalanches and remains conductive until power is removed from it. The terminal PX connects to the reset switch 52 in FIG. 2c, which terminal is normally closed, but which is open when the teacher presses the reset switch to reset the complete system. Thus, the power circuit is momentarily broken up reset at the terminal PX, thereby removing all power from all silicon-controlled rectifiers and extinguishing all of the correct answer-lights 48, 49, 50, and 51 for question No. 1, and at the same time extinguishing any of the other lights located therebelow, and relating to questions 2 through 10 inclusive. The silicon-controlled rectifiers in FIG. 2, therefore, merely serve to keep the proper correct-answer lights illuminated after the response unit A has been scanned and disconnected from the console by advancement of the stepper M to scan a different response unit. The correct answers remain lighted for each response unit which has already been scanned so that the student can study the correct answers to the questions which he has missed.

The relay including winding 53 and contacts 54 and 55 shown in FIG. 2a will be discussed below in connection with the heading Control circuits.

Answer scanning

Referring to FIG. 2c, scanner decks S1, S2, S3, and S4 carry the answers which the student has selected in response to the various questions as each question is sequentially scanned by these switch decks. Scanner decks S5, S6, S7 and S8 carry the correct answers pre-set by the teacher in answer to the corresponding questions. The scanner deck S9 enters the number of correct responses into the grade counter for the response unit manually selected by the teacher for scanning.

Prior to scanning the various response units for the purpose of grading their answers, the teacher has pre-set the correct answers into this system at the console using the switches V1, V2, . . . V10. Each of these switches has two circuits and each circuit has four possible positions corresponding with the four possible multiple-choice answers. For instance, the switch V1 has two sections labeled V1a and V1b, respectively cooperating with scanner decks S1–S4, and S5–S8. The circuit a of each of the correct answer switches is coupled through the switch decks S1–S4, M1–M4, and K1–K4 to the student response switch Q1, which has four positions. Since the wiper of switch Q1 is grounded, one of the four switch positions of Q1 will be grounded, depending upon the answer selected by the student. Therefore, one of the terminals P1, P2, P3, and P4, will be grounded, and therefore one of the terminals R1, R2, R3, or R4 will be grounded. Similarly, one of the switch positions 1, 2, 3, or 4 will be grounded at switch V1a. Obviously if the student has set his switch Q1 to select the same answer as the teacher has pre-selected, the switch V1a will ground one side of the winding 60 of the relay, the other winding terminal being connected to the power source. Thus, the relay contacts 61 will close thereby grounding the wire 62 which is connected to position #1 of scanner deck S9. Therefore, the wiper of deck S9 will be grounded, thereby grounding wire 63, terminal R11, terminal #1 of switch deck M11 which is connected to wire 64 and enters the cable returning to FIG. 2c to ground the left terminal of solenoid-actuated grade counter 65. Since the right terminal of counter 65 is connected to the power source P, the counter will be advanced one position, the counter 65 keeping score of the number of correct answers attained by the student at response unit A.

On the other hand, if the student selected an incorrect answer, the wiper of switch Q1 would be in a position different from the wiper of switch V1a, and the relay 60 would not be energized so that position #1 of switch decks S9 and M11 would not be grounded. Therefore, the counter 65 would not be advanced in response to an incorrect answer.

The wiper of correct answer switch V1b is also in the #1 position, and this switch wiper is used to light the correct-answer light 48 for the purpose of indicating to the student which answer should have been selected. The wiper of switch V1b grounds its switch position number 1, thereby grounding the terminal No. 1 of scanner deck S5, and grounding terminals R5 and P5, and terminal No. 1 of scanner deck K5. This in turn applies a ground to the control electrode 40a of the silicon-controlled rectifier 40, causing it to avalanche and light the bulb 48 which by its position next to switch Q1 on unit A, FIG. 1, shows that the number 1 answer was the correct answer. Since the silicon-controlled rectifier 40 can be extinguished only by interruption of power to the terminal PX during the reset operaton, the lamp 48 continues to glow until the entire system is reset.

The switch decks M1, M2, M3, and M4 remain in position #1 until the answers to all 10 questions have been scanned, but after an appropriate interval of time as determined by the rate of the oscillator 20 the stepper mechanisms K and S advance the scanning decks to position #2 in which the answer selected to question No. 2 is scanned. Through the switch decks K1–K4, M1–M4, and S1–S4, the No. 3 terminal of question response switch Q2 grounds corresponding position 3 of switch V2a. If the teacher has set the wiper of switch V2a in the same position that the student has selected, the relay 66 will close, thereby grounding terminal No. 2 of scanner deck S3 which is still connected to position #1 of switch deck M11, since the stepper M remains in position #1 all of the time that answers are being scanned from unit A. Therefore, another signal ground is pulsed through wire 64 to advance counter 65 to count another correct answer for unit A. Likewise, since switch V2b is also in position #3, it grounds position #2 of scanner deck S7, thereby grounding terminals R7 and P7 and position #2 of switch K7, thereby avalanching silicon-controlled diode 70 and illuminating lamp 71 to indicate that the number 3 answer is the correct answer to question number 2.

After another appropriate interval of time, steppers S and K advance to scan question No. 3. When question No. 10 has been scanned and the scanning decks K and S are in position #10, the scanning is completed, and this fact will be signalled by scanner deck K9 which grounds wire 72 in position #10, thereby energizing relay winding 53 for the purpose of halting the scanners, as explained under the heading Control circuits. When the scanning of unit A has been completed in this manner, the teacher operates another one of the scanning switches 30, 31 . . . 39 in FIG. 2b to select a different unit for scanning.

If the teacher selects unit B, correct answers will ground wire 67, thereby advancing counter 68. If the teacher selects unit J, correct answers will ground wire 69 thereby registering correct answers in counter 73 corresponding with unit J. When all units have been graded, the grades attained by each student remain in view in the counters 65, 68 . . . 73 until the system is reset.

System reset

When the grading has been completed and the teacher has noted the grades appearing on the grade counters corresponding with the various response units, the system can then be reset to commence an entirely new examination and grading function by actuating the reset button 74, which opens normally-closed contacts 52 and closes normally-open contacts 75. The depression of the button 74 breaks the flow of power from the battery to the terminals PX, thereby extinguishing all of the silicon-controlled rectifiers, and extinguishing the correct-answer lamps at all units. The depressing of the reset button also closes the contact 75, thereby grounding the reset wire 76 which travels to the other circuitry through terminals R9 and P11. The grounding of wire 76 applies power to the reset terminals 65a, 68a, and 73a to reset all of the grade counters to zero. The grounding of the reset wire 76 also grounds arms 57 at stepper K, 80 at stepper M, and 90 at stepper S. Under the heading Control circuits, it will be explained in detail that the grounding of the arms 57, 80 and 90 causes the steppers K, M, and S to return all of the switch decks to the "home" position H. When this has been accomplished, the system is completely reset and ready for the next set of answers. The diode 76a prevents the presence of scanning pulses on the wire 76 from resetting the counter units 65, 68 . . . 73 prematurely.

*Control circuits*

Commencing with the system completely reset, the teacher adjusts the switches V1, V2 . . . V10 so that both circuits of each of these switches ground the correct answer terminals of the switch for the questions about to be given to the students.

In response to these questions, the students each select answers to the 10 questions by moving the response switches Q1, Q2 . . . Q10 to appropriate positions to indicate selected ones of the four multiple-choice answers to each question in the window of the switch, FIG. 1. When the student operating unit A has completed his selection of answers to all 10 questions, he closes the switch 25, thereby grounding terminals P9 and illuminating lamp 77 on the console to show the teacher that unit A is ready for scanning. In like manner, the other students, when their answers are ready, close their "ready-for-grading" switches, thereby illuminating the lamps associated with their units to signal readiness on their part for grading under the control of the teacher at the console. The teacher selects the unit for grading by closing one of the switches 30, 31 . . . 39, and the closing of one of these switches moves all of the switching decks M1–M11 to a position corresponding with the unit selected by the teacher. The stepper switch decks M are moved only by the teacher's operation of the selector switches 30–39. From that moment on, the operation of the system becomes automatic to grade all 10 questions, and then to pause until a new response unit is manually selected. The stepping pulse generator 20 delivers spaced pulses of ground polarity to the wire 81, and each of these pulses is sufficient to actuate the stepper mechanisms S and K to move the corresponding scanning deck wipers to the next position. The pulses from the stepping pulse generator 20 are mutually spaced apart in time by intervals sufficient to permit the completion of the scanning of each question and the actuation of the corresponding grade counters 65, 68 . . . 73 before the next pulse arrives from the stepping pulse generator to advance the scanning mechanisms K and S to scan the answer to the next question. Thus, the steppers K and S are sequentially actuated in unison until all 10 questions have been scanned. The rotating shaft extending from each of the stepper mechanisms K, M, and S has a cam 56, 82, or 92, and in the home position of the steppers these cams press arms 57, 80 and 90 to the left so as to break electrical contact with the terminals 58, 83, and 93, respectively. In all other positions of the stepping mechanisms K, M, and S, other than the home positions H, the arms 57, 80 and 90 are in electrical contact with the contacts 58, 83, and 93, respectively.

Thus, when the teacher makes a first selection by pressing one of the switches 30, 31 . . . 39, the intermittent stepper mechanism M moves away from the home position and the arm 80 touches the contact 83. Therefore, a first pulse flows from the wire 81 through the arm 80 and through the switch 23 to the wire 84. Note that the relay winding 21 is energized as soon as the switch deck M9 arives in the position selected by the operator, and when the winding 21 is energized, the normally-closed contacts 22 are opened, thereby de-energizing the stepper M to leave it in that position. The contacts 23 are closed, thereby applying a first pulse from the stepping pulse generator 20 to the wire 84 and also to the contacts R10. The pulse then flows through the wire 94 and energizes the stepper mechanism S causing the scanner decks S1–S9, to move to position #1 in which they scan examination question #1.

The stepping mechanism K is also advanced by this first pulse which travels from the contacts 23 to the wiper of deck M10. Assuming that the teacher has selected unit A for grading, deck M10 will be in the #1 position, and the pulse will travel on wire 86 through terminals P10, through the normally-closed contacts 54, and through wire 95 to advance the stepper mechanism K to the next position, i.e., position #1.

The answer to question No. 1 is scanned as set forth above in the heading Answer scanning, and after an interval of time determined by the repetition rate of the stepping generator 20, another pulse is delivered through wires 81, 84, 94, and 95 to again advance the scanning steppers K and S in unison, this time to scan the answer at question No. 2. This scanning continues, question-by-question until question No. 10 has been reached.

When both of the steppers K and S are in the position where they scan question No. 10, the wiper of scanning deck K9 will be grounded, thereby grounding wire 72 and energizing relay winding 53 to open the contacts 54 and prevent any further stepping pulses from the generator 20 from advancing the stepper K. In other words, the stepper K remains in position #10, actually, until the reset button 74 is pressed. The energizing of the relay winding 53 also grounds wire 87 through contacts 55 and applies a ground through terminals P12 to illuminate lamp 88, thereby indicating on the console that the scanning of unit A is "complete."

The next pulse from the stepping pulse generator 20 cannot operate stepper K because the relay 53 is holding the contacts 54 open, but it can operate stepper S through the closed contacts 93a. When it does so it moves the stepper S into "home" position in which the cam 92a moves the arm 90a rightwardly and opens the contacts 93a, thereby opening the circuit through the terminals R10 and the wire 94 to leave the stepper mechanism S inoperative and reset in "home" position. It remains in this position until the teacher selects another student response unit by actuating another switch 30, 31 . . . 39.

When the teacher makes such a selection, the ground appearing on position #1 of deck M9 disappears and moves to the newly selected location, for instance to deck position #10 as a result of closing switch 39. Therefore, relay winding 21 becomes de-energized until stepper M has moved to position #10. When this position has been reached, the ground reappears on the wiper deck M9 and re-energizes winding 21 to open contacts 22, and to close contacts 23 to pass more pulses from generator 20 to scanner S and to the scanner in response unit J. However, since contacts 93a are still open at scanner S, the first pulse cannot operate this stepper through the wire 94.

For this reason, the wire 94a is provided to carry the first pulse in the new scanning cycle to the stepper S through the terminals R13. The relay winding 96, when energized, closes contacts 97 leading to terminals R13 from wire 84 to which the stepping pulses are applied. One side of the winding 96 is grounded when the wiper on deck M9 is grounded, but the other side of the winding 96 connects to the power source P through a capacitor 98 and a resistor 99, the latter having too high a value to maintain the winding energized sufficiently to keep the contacts 97 closed. This is a common relay circuit which closes the contacts by the transient flow of current through the capacitor 98, but opens soon after, when the capacitor is fully charged. The resistor 99 functions to discharge the capacitor 98 while the right-hand side of the winding is de-energized. The R-C constant is selected so as to hold the contacts 97 closed long enough to pass the first pulse or two from the generator 20 at the beginning of a new scanning cycle, i.e., of response unit J.

The first scanning pulse thus moves the stepping mechanism S from "home" position to position #1, and simultaneously moves the scanning stepper corresponding with the stepper K, but located in the newly-selected response unit J to position #1, thereby scanning that unit to determine the student's response and display the correct answer to the question by illuminating the correct-answer light in each unit according to the correct answer inserted by the teacher at the console. Soon the relay contacts 97 drop open, leaving wire 94a open and permitting subsequent pulses to be carried by the wire 94.

When all of the units have been scanned, all of the "ready" lights 77—and all of the "complete" lights 88—will be illuminated, and the teacher will then note the number of correct answers scored by each unit by reading the accumulating means comprising the counters 65, 68, . . . 73. The teacher will then reset the entire system by depressing the reset button to commence the reset function as described in the preceding heading of this specification. Every one of the stepper mechanisms includes a set of contacts, all of which contacts are connected through terminals P13 and R12 and mutually in series to control a light bulb 100 in FIG. 2c. One side of the light bulb 100 is connected to the power source P, and when the other terminal is grounded, the bulb 100 will light signifying that all units have been reset, meaning that all steppers are in the "home" position. Since there will always be a first response in every system, one side of the contacts 59 at the extreme left side of FIG. 2a is grounded. In all of the other response units, the contacts corresponding with contacts 59 are merely connected in series with the wire 89. For instance, the contacts corresponding with contacts 59, but located in unit B, will be connected in series with the terminals 99, and the contacts corresponding with the contacts 59, but located in unit J, will be connected with the terminals 101. The wire 89 is also connected in series with contacts 102 at the stepper mechanism M, and contacts 103 at stepper mechanism S are also connected in series with the light bulb 100. These contacts in each of the response units, the contacts 102 at stepper M, and the contacts 103 at stepper S are normally open so that the light bulb 100 is normally extinguished in all positions of the associated stepping mechanisms, except in the home positions thereof. Thus, the right-hand wire from the light bulb 100 can be grounded so as to light the bulb only when all of the stepper mechanisms in all of the units and in the console are in the "home" position. Thus, when the teacher operates the reset button, he must hold the button down until the light bulb 100 lights indicating that the reset is complete.

A new examination and grading cycle can then be begun by distributing the examination questions to the students and by pre-setting the new list of correct answers into the correct-answer switches V1, V2, . . . V10 at the console. The students themselves will have to turn off their ready lights 25 at their respective units before the new examining cycle is commenced.

The present invention is not to be limited to the exact forms shown in the drawings, for obviously changes may be made therein within the scope of the following claims.

I claim:

1. An electrical system for indicating at a central console the score attained by persons at separate response units where each person selects from multiple-choice answers his responses to plural questions, comprising:
   (a) response switches at each unit corresponding with said plural questions and each having multiple positions corresponding with the selectable answers;
   (b) first scanning means in each unit and connected for scanning the multiple positions of the response switches;
   (c) correct-answer switches at the console pre-settable to multiple-choice positions corresponding with the positions of the response switches;
   (d) second scanning means at the console and connected for scanning the positions of the answer switches;
   (e) means at the console corresponding with each unit for accumulating the number of selected response-switch positions which coincide with pre-set correct-answer positions;
   (f) unit selector means at the console for connecting the second scanning means both to the accumulating means and to the first scanning means of a selected unit; and
   (g) means for advancing in unison the scanning means in the console and in the selected unit to sequentially scan all of the switch positions to thereby actuate the accumulating means for that unit.

2. In a system as set forth in claim 1, said scanning means each comprising a multiple-deck stepping switch responsive to pulses to move the switch to different positions, each corresponding with a different question; stepping pulse generator means connected to drive said stepping switch means in unison; and the decks of the first scanning means being selectively connected by said selector means to the decks of the second scanning means.

3. In a system as set forth in claim 2, a source of power, said accumulating means comprising electrically-operated counters; and said response switches, said scanners, said correct-answer switches, and said counters being coupled to form series circuits across said power source, so that a counter is actuated whenever the response switch position in a series circuit is the same as the correct-answer switch position in the same series circuit.

4. An electrical system for indicating at a central console the score attained by persons at separate response units where each person selects from multiple-choice answers his responses to plural questions, comprising:
   (a) response switches at each unit corresponding with said plural questions and each having multiple positions corresponding with the selectable answers;
   (b) first scanning means in each unit connected for scanning the multiple positions of the response switches and each re-settable to a "home" position;
   (c) correct-answer switches at the console pre-settable to multiple-choice positions corresponding with the positions of the response switches;
   (d) second scanning means at the console connected for scanning the positions of the answer switches and re-settable to a "home" position;
   (e) means at the console corresponding with each unit for accumulating the number of selected response-switch positions which coincide with pre-set correct-answer positions and each resettable to a "home" position reading zero;
   (f) unit selector means at the console for connecting the second scanning means both to the accumulating means and to the first scanning means of a selected unit;
   (g) means for resetting the second scanning means to "home" position after the scanning of each selected unit is completed;
   (h) means for advancing in unison the scanning means in the console and in the selected unit from their "home" positions sequentially scan all of the switch positions to thereby actuate the accumulating means for that unit; and
   (i) system reset means coupled to all of the scanning means and to the accumulating means and operative when actuated to reset these means to their respective "home" positions.

5. In a system as set forth in claim 4, reset indicator means connected to said scanning and accumulating means and operated thereby when in their home positions to indicate the completion of the reset function.

6. In a system as set forth in claim 4, said unit selector means having a "home" position in which none of the units is connected for scanning, and said system reset means being coupled to the selector means to reset the latter to "home" position when the reset means is actuated.

7. In a system as set forth in claim 4, said scanning means each comprising a multiple-deck stepping switch responsive to pulses to move the switch to different positions, each corresponding with a different question; stepping pulse generator means connected to drive said stepping switch means in unison; and the decks of the first scanning means being selectively connected by said selector means to the decks of the second scanning means.

8. In a system as set forth in claim 7, a source of power, said accumulating means comprising electrically-operated counters; and said response switches, said scanners, said correct-answer switches, and said counters being coupled to form series circuits across said power source, so that a counter is actuated whenever the response switch position in a series circuit is the same as the correct-answer switch position in the same series circuit.

9. An electrical system for indicating at a central console the score attained by persons at separate response units where each person selects from multiple-choice answers his responses to plural questions, comprising:
  (a) response switches at each unit corresponding with said plural questions and each having multiple positions corresponding with the selectable answers;
  (b) first scanning means in each unit and connected for scanning the multiple positions of the response switches;
  (c) correct-answer switches at the console pre-settable to multiple-choice positions corresponding with the positions of the response switches;
  (d) correct-answer indicating means at each unit and corresponding with the various selectable switch positions;
  (e) second scanning means at the console and connected for scanning the positions of the answer switches;
  (f) means at the console corresponding with each unit for accumulating the number of selected response-switch positions which coincide with pre-set correct-answer positions;
  (g) unit selector means at the console for connecting the second scanning means both to the accumulating means and to the first scanning means of a selected unit, and for connecting the correct-answer switch positions to operate appropriate indicating means at the selected unit; and
  (h) means for advancing in unison the scanning means in the console and in the selected unit to sequentially scan all of the switch positions to thereby actuate the accumulating means for that unit.

10. In a system as set forth in claim 9, circuit means interposed between the indicating means at the selected unit and the unit selector means and effective to retain the indicating means of that unit operative after said unit selector means has selected a different unit.

11. In a system as set forth in claim 10, reset means operative after the scanning of the units has been completed to reset the scanning means, the accumulating means and the unit selecting means to an initial position, and to render inoperative said circuit means in order to disable the correct-answer indicating means at said units.

12. In a system as set forth in claim 10, said scanning means each comprising a multiple-deck stepping switch responsive to pulses to move the switch to different positions, each corresponding with a different question; stepping pulse generator means connected to drive said stepping switch means in unison; and the decks of the first scanning means being selectively connected by said selector means to the decks of the second scanning means.

13. In a system as set forth in claim 12, a source of power, said accumulating means comprising electrically-operated counters; and said response switches, said scanners, said correct-answer switches, and said counters being coupled to form series circuits across said power source, so that a counter is actuated whenever the response switch position in a series circuit is the same as the correct-answer switch position in the same series circuit.

14. In a system as set forth in claim 13, said correct-answer indicating means comprising indicator lamps corresponding with each response switch position, and said circuit means comprising a silicon-controlled rectifier in series with each lamp and coupled to be controlled by a pre-set correct-answer switch position at the console.

15. In a system as set forth in claim 14, each correct-answer switch having two paths, one path being connected in one of said series circuits, and the other path being connected to control a silicon-controlled rectifier.

16. An electrical system for indicating at a central console the score attained by persons at separate response units where each person selects from multiple-choice answers his responses to plural questions, comprising:
  (a) response switches at each unit corresponding with said plural questions and each having multiple positions corresponding with the selectable answers;
  (b) first scanning means in each unit and connected for scanning the multiple positions of the response switches;
  (c) correct-answer switches at the console pre-settable to multiple-choice positions corresponding with the positions of the response switches;
  (d) second scanning means at the console and connected for scanning the positions of the answer switches;
  (e) means at the console corersponding with each unit for accumulating the number of selected response-switch positions which coincide with pre-set correct-answer positions;
  (f) means on the console corresponding with each unit for indicating when the person is "ready" to have his answer selection scanned;
  (g) means at each unit under the control of the person for operating his "ready" indicating means;
  (h) unit selector means at the console for connecting the second scanning means both to the accumulating means and to the first scanning means of a selected unit whose "ready" indicating means has been operated; and
  (i) means for advancing in unison the scanning means in the console and in the selected unit to sequentially scan all of the switch positions to thereby actuate the accumulating means for that unit.

17. In a system as set forth in claim 16, means on the console corresponding with each unit for indicating when the scanning has been completed, and connected to the scanning means of that unit to be operated thereby when it has scanned the last of said plural questions.

18. In a system as set forth in claim 16, said scanning means each comprising a multiple-deck stepping switch responsive to pulses to move the switch to different positions, each corresponding with a different question; stepping pulse generator means connected to drive said stepping switch means in unison; and the decks of the first scanning means being selectively connected by said selector means to the decks of the second scanning means.

19. In a system as set forth in claim 18, a source of powers, said accumulating means comprising electrically-operated counters; and said response switches, said scanners, said correct-answer switches, and said counters being coupled to form series circuits across said power source, so that a counter is actuated whenever the response switch position in a series circuit is the same as the correct-answer switch position in the same series circuit.

20. An electrical system for indicating and recording at a central location the responses for each person in a group of persons to whom a compiled list of questions and associated multiple-choice answers are presented, comprising:
  (a) a separate response unit for each person, each unit having a response switch corresponding with each question in the list and each switch having multiple-positions corresponding with selectable answers;

(b) each unit having correct-response indicators corresponding with each selectable answer at each switch;
(c) each unit having a "ready" switch operable by the person to signify his completion of answer selections;
(d) a console at said central location including a "ready" indicator connected to each of said "ready" switches;
(e) unit-selector means at the console to select one unit whose "ready" indicator has been operated;
(f) correct-answer switch means at the console and having pre-settable positions corresponding with the selectable answers;
(g) scanner means at the console and in the units for scanning the switch positions;
(h) scanner actuating means for actuating the scanner means in the console and in one selected unit to scan the switch positions, one question at a time, and for completing a circuit in the console each time coincidence is had between positions of the switches in the console and in the selected unit signifying a correct answer to a particular question;
(i) recording means in the console corresponding with each unit and connected to said circuit to accumulate the number of correct answers at that unit;
(j) scan-complete indicator means at the console for each unit and connected for operation by the scanner when scanning of that unit is completed;
(k) means connected to the correct-response indicators in a unit being scanned to selectively operate the former when the latter's switch positions are scanned; and
(l) system reset means to be operated after scanning of all questions and answers has been completed.

References Cited by the Examiner

UNITED STATES PATENTS

| | | | |
|---|---|---|---|
| 2,738,595 | 3/1956 | John et al. | 35—48 |
| 2,793,446 | 5/1957 | Childs et al. | 35—48 |
| 3,077,038 | 2/1963 | Williams et al. | 35—9 |
| 3,186,109 | 6/1965 | Brinton | 35—9 |

EUGENE R. CAPOZIO, *Primary Examiner.*

R. W. WEIG, *Assistant Examiner.*